United States Patent [19]
Drabeck et al.

[11] Patent Number: 5,598,169
[45] Date of Patent: Jan. 28, 1997

[54] DETECTOR AND MODULATOR CIRCUITS FOR PASSIVE MICROWAVE LINKS

[75] Inventors: Lawrence M. Drabeck, Long Branch; Martin V. Schneider, Holmdel; Cuong Tran, Howell, all of N.J.

[73] Assignee: Lucent Technologies Inc., Murray Hill, N.J.

[21] Appl. No.: 409,782

[22] Filed: Mar. 24, 1995

[51] Int. Cl.[6] .................................................. H01Q 1/26
[52] U.S. Cl. .......................... 343/701; 343/702; 455/280
[58] Field of Search .................................. 343/701, 702, 343/700 MS, 793, 795; 455/280, 281; H01Q 1/26

[56] References Cited

U.S. PATENT DOCUMENTS

| | | | |
|---|---|---|---|
| 3,098,973 | 7/1963 | Wickersham et al. | 343/701 |
| 3,852,755 | 12/1974 | Works et al. | 343/70 |
| 4,313,121 | 1/1982 | Campbell et al. | 343/828 |
| 5,386,214 | 1/1995 | Sugawara | 343/701 |

*Primary Examiner*—Hoanganh T. Le

[57] ABSTRACT

An RF apparatus (e.g., a wireless label) provides improved backscattering of an incident RF signal by utilizing a separate modulator diode, which connects across the antenna, to modulate the backscattering of the antenna. A separate detector diode connects across the antenna through an impedance matching network to detect modulated signals received by the antenna.

14 Claims, 4 Drawing Sheets

5,598,169

DETECTOR AND MODULATOR CIRCUITS FOR PASSIVE MICROWAVE LINKS

TECHNICAL FIELD

This invention relates to wireless electronic labels or modules and, more particularly, to improved detector and modulator circuits for use in such labels.

BACKGROUND OF THE INVENTION

Optimized detector/modulator circuits are key components in passive microwave links which use smart labels and tags for identification and tracking of objects in shipping and transportation. The recent development of low-cost detector diodes and miniature antennas made it possible to develop electronic labels for the wireless supermarket and related applications requiring the use of inexpensive tags or smart labels serving as terminals in a modulated backscatter microwave link.

Our co-pending patent application, Ser. No. 08/380277, filed Jan. 30, 1995, and entitled "Wireless Electronic Module," teaches that the maximum sensitivity for the downlink (base station to label module) communication is achieved if the antenna port impedance is the complex conjugate of the diode impedance. While operating the antenna at such an impedance does improve downlink communications, it does not result in a maximum cross-section of a wireless label needed for efficient backscattering of an incident CW carrier to provide uplink (label to base station) communications.

SUMMARY OF THE INVENTION

In accordance with the present invention, an apparatus (e.g., a wireless label) provides improved backscattering of an incident Radio Frequency (RF) signal by utilizing a separate modulator diode, which connects across the antenna to modulate the backscattering of the antenna. A separate detector diode connects across the antenna to detect modulated signals received by the antenna, the detector diode connecting to the antenna through a matching network such that the impedance of the detector diode at a predetermined RF frequency conjugately matches an antenna port impedance transformed through the matching network. The antenna may be dipole, microstrip patch, monopole or folded monopole.

In one embodiment, the detector diode connects to the antenna port through an impedance matching network. In another embodiment, the modulator diode is a tunnel diode which may be biased in a negative resistance portion of its current-voltage characteristics when the apparatus is operated in a backscatter mode and biased at its valley voltage when the apparatus is operated in a receive mode.

DETAILED DESCRIPTION

In the following description, each item or block of each figure has a reference designation associated therewith, the first number of which refers to the figure in which that item is first located (e.g., 110 is located in FIG. 1)

The present invention describes a circuit for which the downlink communication signal (base station to label) and the uplink communication signal (backscattering from the label to base station) are optimized by means of separate detector and switching (may also be referred to as modulator) diodes. Applicants have noted that, in prior art wireless labels, the simultaneous optimization of the downlink and uplink signals cannot be achieved using a single diode which is biased at two different current levels. In such an arrangement, the diode acts as a detector when biased at a first current level and acts as a low impedance when biased at a second current level. However, such an arrangement results in a compromise or tradeoff in downlink or uplink communication performance.

Figure 1:
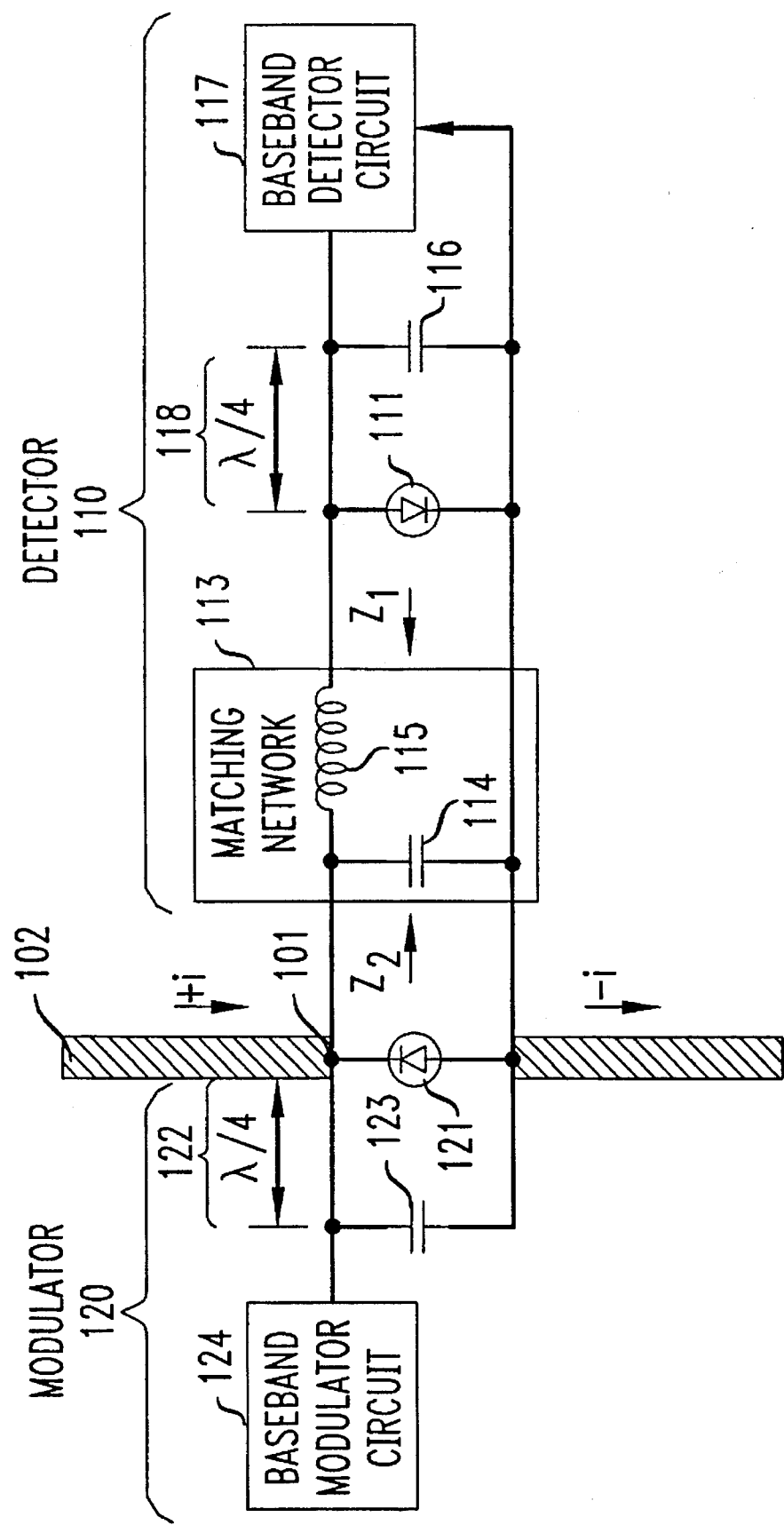
FIG. 1 shows a first embodiment of an antenna including a detector circuit and a modulator circuit in accordance with the present invention.

A wireless label including a dipole antenna 102, a detector 110 and a modulator 120, in accordance with the present invention, is shown in FIG. 1. The dipole antenna 102 has a half-wavelength, each of the two branches being a quarter-wavelength long. The dipole antenna 102 may also be implemented as a "microstrip patch" antenna.

The wireless label illustratively operates in one of three modes: a sleep mode, a receiving mode, or a backscattering mode. The circuitry which performs this function, as well as other functions which are part of the wireless label but not necessary for an understanding of the present invention, is not further described herein. Our previously referenced patent application illustratively describes more details of the detector circuit operation.

Most of the time, the wireless label operates in the sleep mode so as to extend the lifetime of its battery (not shown). The wireless label, using well-known circuitry (not shown), periodically "wakes up" and enters the receiving mode looking for any modulated carrier signals (downlink signals) being sent to it. This downlink signal is typically an on/off keyed amplitude modulated carrier signal. If no modulated carrier signal is detected, the wireless label returns to the sleep mode. If a modulated carrier signal is received, it is detected and processed by the wireless label. A predetermined period of time after the completion of the receiving mode, the wireless label enters the backscatter or reflection mode. The exact timing between the receiving mode and backscattering mode is determined by label circuitry (not shown) which implements the predetermined communication protocol established between the base station and the wireless label. During the backscatter mode, the wireless label modulates a carrier wave signal received from the base station with the information to be sent to the base station, thereby forming the uplink signal. The uplink signal is modulated by switching modulator diode 121 on and off using an information signal received from baseband modulator circuit 124, as will be described in a later paragraph.

The detector circuit 110 includes matching network 113 that connects detector diode 111, transmission line 118, capacitor 116, and baseband circuit 117 to port 101 of antenna 102. The modulator circuit 120 includes modulator diode 121, transmission line 122, capacitor 123, and baseband modulator circuit 124.

Separate diodes 111 and 121 are utilized in the detector 110 and modulator 120 circuits, respectively, to maximize the receiving of a modulated carrier signal and reflecting (backscattering) of a received carrier signal. According to one aspect of the invention, the detector diode 111 and modulator diode 121 are connected across the antenna 102 in opposite polarities. Such a connection arrangement insures that, when the modulator diode 121 is modulated into the forward-biased region during the backscatter mode, it does not forward-bias the detector diode 111. Similarly, during the receive mode, when the detector diode 111 is forward-biased, the modulator diode 121 is reverse-biased.

If the diode 121 shown in FIG. 1 connected across the antenna port is a tunnel diode, a bypass capacitor must be added in series with the inductor 115 shown in FIG. 1. The bypass capacitor is needed because diode 121, being a tunnel diode, is conducting current for both negative and positive voltages. The bypass capacitor prevents current from flowing through the detector diode 111 for any voltage applied through the baseband modulator circuit 124.

Figure 3:
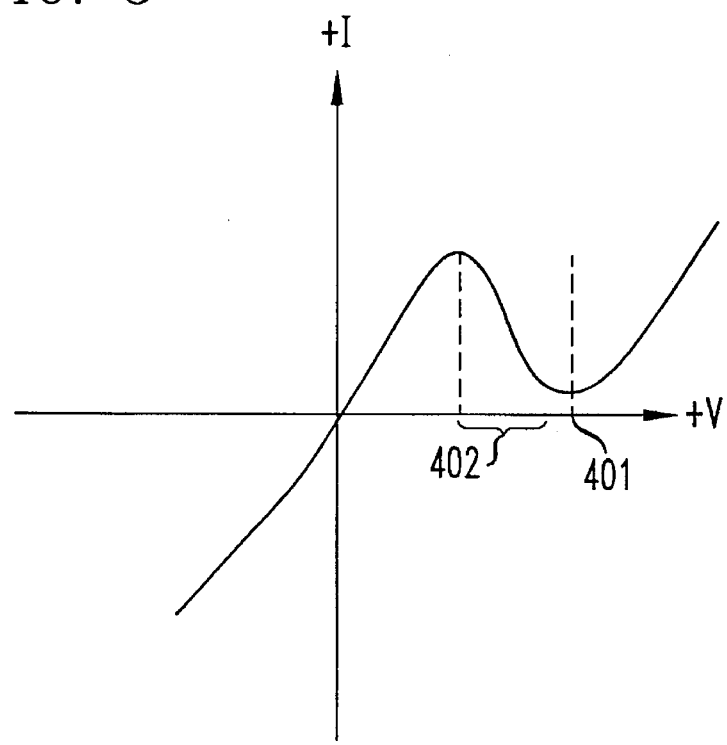
FIG. 3 shows typical I–V characteristics of a Schottky diode.

In detector circuit 110, during a receiving mode, the detector diode 111, illustratively a zero DC current biased Schottky detector diode 111, detects or rectifies a received modulated carrier signal. As shown in FIG. 3, the detector diode 111, when operated at a zero biased current, has essentially a capacitive impedance. Returning to FIG. 1, the capacitive impedance of detector diode 111, at the received modulated carrier frequency, is conjugately matched to the inductive impedance $Z_1$ of the matching network 113 terminated by port impedance of dipole antenna 102. This matching network 113 illustratively includes a capacitor 114 and inductor 115 which may be implemented by means of a simple, lumped or hybrid integrated LC matching circuit.

This matching network 113 transforms the capacitive junction impedance of detector diode 111 into an impedance $Z_2$ which matches the real port impedance of dipole antenna 102. The modulator diode 121, illustratively a tunnel diode shown in FIG. 4, during the receiving mode is forward-biased in the valley 401 region of the I–V characteristics curve, creating a small parasitic capacitance across the port 101 of antenna 102. The capacitance of modulator diode 121 acts together with capacitor 114 of matching network 113.

If modulator diode 121 is a conventional diode, it is biased at zero volts and exhibits a capacitive impedance when so biased.

The detected output of detector diode 111 is inputted to baseband detector circuit 117 via a quarter-wave transmission line 118 and a capacitor chip 116 which, at the received modulated carrier frequency, presents an open-circuit impedance to detector diode 111 to prevent RF currents from flowing into the baseband circuit 117. Similarly, during the detection mode, the quarter-wave transmission line 122 and capacitor 123 also present an open-circuit impedance to prevent RF currents at port 101 of antenna 102 from flowing back into baseband modulator circuit 124.

During the reflecting or backscattering mode, modulator diode 121 is forward-biased by an on-off modulation signal received from baseband modulator circuit 124. The forward-biasing current in diode 121 causes diode 121 to present an RF short-circuit impedance across antenna port 101. When a continuous wave (CW) signal at a resonant predetermined frequency is received by antenna 102, it generates high RF currents (+i, −i) in antenna 102 which maximize the backscatter energy reradiated from antenna 102. Consequently, the incoming CW signal is backscatter modulated when the impedance of modulator diode 121 is modulated by turning it on and off using the signal from baseband modulator circuit 124.

Figure 4:
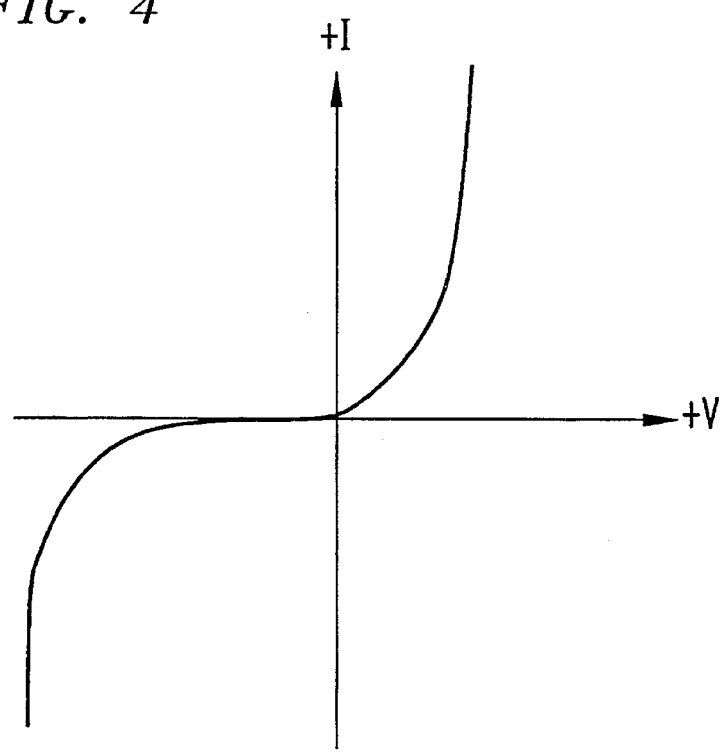
FIG. 4 shows typical I–V characteristics of a tunnel diode.

Backscattering can be enhanced even further if modulator diode 121 is a tunnel diode which is biased in the negative resistance region, shown as 402 in FIG. 4, when it is turned on.

When the modulator diode 121 is turned off during the backscattering mode, the quarter-wave transmission line 122 and capacitor 123 present an open-circuit impedance to prevent RF antenna currents from the incoming CW signal from flowing into baseband modulator circuit 124. The quarter-wave transmission line 118 and capacitor 116 also present an open-circuit impedance to prevent any of the RF antenna currents from flowing into baseband circuit 117 of detector circuit 110.

The intensity of the backscattered wave re-radiated from antenna 102 is the product of the incident CW signal field intensity times the backscattering cross-section of the antenna. This cross-section is a function of the antenna geometry and the port impedance of the antenna as outlined below.

The effective area of a small isotropic antenna can be readily derived from the basic antenna equations. If the antenna aperture, $D_0$, is small with respect to one wavelength $$D_0 < \lambda_0 \qquad (1)$$

one obtains for the radius, $r_0$, which defines the boundary between the radiative and the reactive region, $$r_0 = \frac{\lambda_0}{2\pi} . \qquad (2)$$

The resulting effective area, which is the cross-section of the virtual cavity formed by the antenna, is for a small isotropic antenna $$A_{\text{eff}} = \pi r_0^2 = \frac{\lambda_0^2}{4\pi} . \qquad (3)$$

Various detailed derivations of this basic equation have been reviewed recently by D. C. Hogg in the article entitled "Fun with the Friie Free-Space Transmission," *IEEE Antennas and Propagation Magazine*, Vol. 35, August 1993, pp. 33–35.

The cross-section for backscattering is identical to the effective area if the antenna port is terminated with an impedance which is equal to the port impedance. For the case of a dipole antenna with a total length of $\lambda_{0+b}/2$ with a load impedance of 73 ohms terminating the antenna port, the cross-section is that shown by equation (3).

This cross-section is enhanced by a factor of four if the port is short-circuited and if the antenna is resonant at the frequency of the incident field. The increase of the scattering cross section by 6 dB occurs because the currents +i and −i flowing in and out of the port are doubled, similar to the doubling of the current in a shorted transmission line as opposed to a current flowing into the matched load terminating a transmission line. For the case of an open antenna port, the antenna is split into two scatterers which resonate at the second harmonic frequency $2f_0$. At the fundamental frequency $f_0$, the scattering cross-section drops to nearly zero because the currents flowing in the two conducting parts are very small.

Consequently, for our FIG. 1 embodiment, by switching modulator diode 121 between an open-and a short-circuit impedance, the load impedance $Z_2$ presented across antenna port 101 switches between 72 ohms ($Z_2$) and zero ohms. This results in a modulated backscatter wave that varies by a factor of 4, or 6 dB in power.

Figure 2:
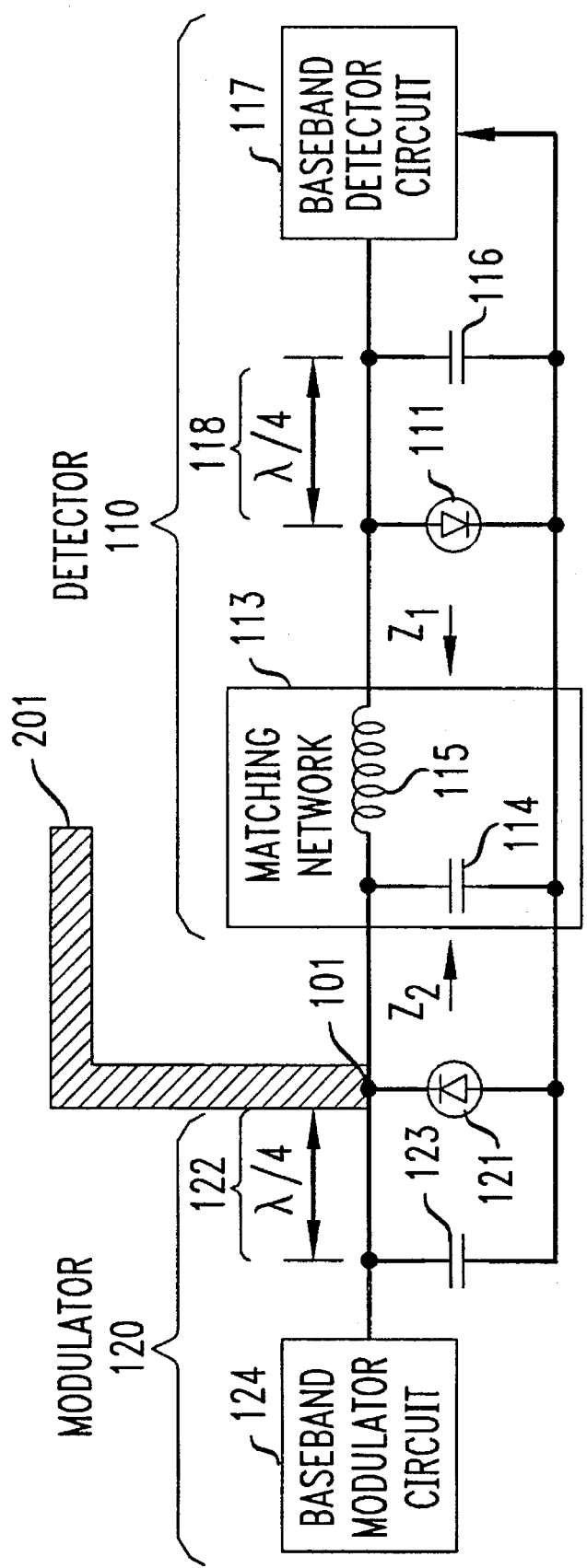
FIG. 2 shows a second embodiment of the present invention.
Figure 5:
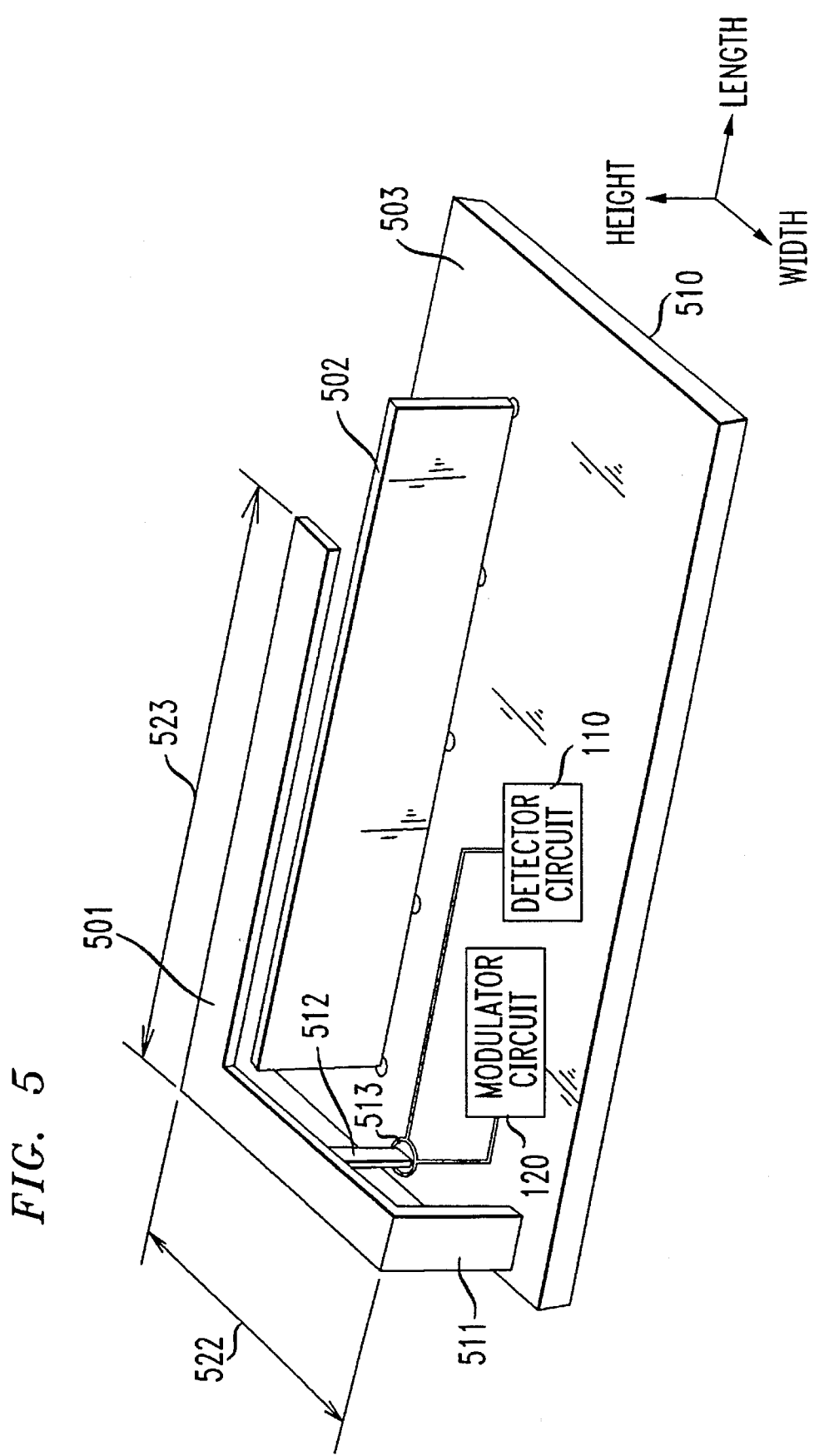
FIG. 5 shows an embodiment of the present invention using a folded monopole antenna.

With reference to FIG. 2, there is shown a wireless label identical to FIG. 1 except that it includes a quarter-wavelength monopole antenna 201 rather than the dipole antenna 102 of FIG. 1; antenna 201 is illustratively implemented as a folded monopole. One such folded monopole may be implemented using an inverted-F structure as shown in FIG. 5. Such folded monopole antenna 501 is typically utilized with a ground shield 502 mounted on ground plane 503 to shield the detector 110 and modulator 120 circuits as well as other circuits of the wireless label from antenna 501. The antenna 501 illustratively is implemented as a unitary L-shaped microstrip conductor 510 having two support legs or strips 511 and 512, thereby forming the folded monopole inverted-F antenna. These support strips 511 and 512 maintain the antenna 501 a predetermined height above ground plane 503. The first support strip 511 is electrically connected or shorted to ground plane 503 which is formed by a deposited metal surface on the top and bottom of printed circuit board 510. The second strip 512 is isolated from ground plane 503 by a thin dielectric material which is deposited over the ground plane 503. The dielectric material may be, illustratively, FR-4, a low-cost circuit board material. The bottom part 513 of the second strip 512 forms an antenna port 513 for antenna 501, which means that a signal incident on antenna 501 generates an RF voltage between the bottom of the second strip 512 (antenna port 513) and the ground plane 503. This RF voltage is connected to the detector 110 and modulator 120 circuits of FIG. 2, illustrated for convenience as circuit blocks in FIG. 5.

The antenna has a total length (522+523) of about $$\frac{3\lambda_0}{8}$$

which is about 5.0 cm at an operating modulated carrier frequency of 2.45 GHz. The height (511) of the support strips 511 and 512 is about 0.8 cm. The antenna 501 illustratively may be fabricated from a stainless steel sheet by cutting an essentially L-shaped geometry (formed by segments 523 and 511,522, in addition to the second strip 512 extending perpendicularly to 522) using a well-known computer-controlled wire Electron Discharge Machining (wire EDM). The resulting L-shaped metal piece is then appropriately bent to obtain the inverted-F shape of antenna 501.

What has been described is merely illustrative of the application of the principles of the present invention. Other arrangements and methods can be implemented by those skilled in the art without departing from the spirit and scope of the present invention.

The invention claimed is:

1. An RF apparatus, comprising
   an antenna,
   a detector diode connected across the antenna to detect modulated signals received by the antenna, said detector diode connecting to the antenna through a matching network such that an impedance of the detector diode at a predetermined RF frequency conjugately matches an antenna port impedance transformed through the matching network, and
   a modulator diode connected across the antenna to modulate backscattering of the antenna.

2. The apparatus of claim 1 wherein the antenna is a folded monopole.

3. The apparatus of claim 1 wherein the antenna is a dipole.

4. The apparatus of claim 3 wherein the dipole antenna is a half-wavelength long and the antenna port impedance is real.

5. The apparatus of claim 1 wherein the modulator diode is a tunnel diode.

6. The apparatus of claim 5 wherein the tunnel diode is biased off during the time when the apparatus is in a receiving mode.

7. The apparatus of claim 5 wherein the tunnel diode is biased in a negative resistance portion of its forward-biased region during the time when the apparatus is in a backscatter mode.

8. The apparatus of claim 5 wherein the tunnel diode is biased substantially at a valley voltage of its forward-biased region during the time when the apparatus is in the receiving mode.

9. The apparatus of claim 1 wherein
   the detector and modulator diodes connect across the antenna in different directions.

10. The apparatus of claim 1 wherein
    a detector circuit connects across the detector diode through a transmission circuit which provides an essentially open circuit impedance across the detector diode at the predetermined frequency.

11. The apparatus of claim 10 wherein the transmission circuit includes a quarter-wavelength transmission line connected between the detector diode and a capacitor at an input of a connected detector circuit.

12. The apparatus of claim 1 wherein a modulator circuit connects across the modulator diode through a transmission circuit including a quarter-wavelength transmission line connected across the modulator diode and a capacitor at an input of a connected modulation circuit.

13. The apparatus of claim 1 wherein the detector diode is a Schottky detector diode.

14. An RF apparatus for operating in at least a receiving mode and a backscattering mode, the apparatus comprising:
    an antenna for receiving an RF signal, the antenna having an antenna port impedance;
    a detector circuit for detecting the RF signal during the receiving mode of the apparatus, the detector circuit comprising,
       a matching network, and
       a detector diode connected across the antenna through the matching network such that an impedance of the detector diode at a predetermined RF frequency conjugately matches the antenna port impedance transformed through the matching network; and
    a modulator circuit for modulating the signal for backscattering during the backscattering mode, the modulator circuit comprising,
       a modulator diode connected across the antenna to enhance the backscattering of the antenna, and
       a baseband modulator circuit for activating and deactivating the modulator diode to modulate backscattering of the antenna.

* * * * *